(12) United States Patent
Hammer

(10) Patent No.: US 9,734,629 B2
(45) Date of Patent: Aug. 15, 2017

(54) SYSTEMS AND METHODS FOR CREATING NEAR REAL-TIME EMBOSSED MESHES

(75) Inventor: Vincent M. Hammer, Milton, VT (US)

(73) Assignee: 3D Systems, Inc., Rock Hill, SC (US)

( * ) Notice: Subject to any disclaimer, the term of this patent is extended or adjusted under 35 U.S.C. 154(b) by 1748 days.

(21) Appl. No.: 13/035,381

(22) Filed: Feb. 25, 2011

(65) Prior Publication Data

US 2011/0254839 A1 Oct. 20, 2011

Related U.S. Application Data

(60) Provisional application No. 61/308,788, filed on Feb. 26, 2010.

(51) Int. Cl.
*G06T 17/10* (2006.01)
*G06F 3/01* (2006.01)
*G06T 19/00* (2011.01)
*G06T 17/00* (2006.01)

(52) U.S. Cl.
CPC .............. *G06T 19/00* (2013.01); *G06T 17/00* (2013.01); *G06T 2200/28* (2013.01); *G06T 2210/52* (2013.01)

(58) Field of Classification Search
CPC .............. G06T 19/20; G06T 2219/2021; G06T 15/005; G06T 17/20; G06T 17/205
See application file for complete search history.

(56) References Cited

U.S. PATENT DOCUMENTS

| 6,111,577 | A | 8/2000 | Zilles et al. |
| 6,421,048 | B1 | 7/2002 | Shih et al. |
| 6,867,770 | B2 | 3/2005 | Payne |
| 6,958,752 | B2 | 10/2005 | Jennings, Jr. et al. |
| 7,149,596 | B2 | 12/2006 | Berger et al. |
| 7,626,589 | B2 | 12/2009 | Berger |
| 7,889,209 | B2 | 2/2011 | Berger et al. |
| 2004/0196285 | A1* | 10/2004 | Rice et al. ................ 345/423 |
| 2005/0128210 | A1* | 6/2005 | Berger ..................... 345/582 |
| 2005/0143654 | A1* | 6/2005 | Zuiderveld et al. ...... 600/443 |

(Continued)

FOREIGN PATENT DOCUMENTS

WO WO-2005055148 A1 6/2005

OTHER PUBLICATIONS

Kalos, et al., "Displacement Mapping on the GPU—State of the Art," Blackwell Publishing Ltd., vol. 27, No. 6, Sep. 2008, 24 pages.

(Continued)

*Primary Examiner* — Sultana M Zalalee

(57) ABSTRACT

A system is provided for creating a preview embossed mesh for graphical display to a user. The system includes a graphical user interface device and a computer, which includes a Graphics Processing Unit (GPU) and a Central Processing Unit (CPU). A memory for use with the computer is configured to (a) determine a 3D volumetric mask, (b) determine a distance map corresponding to the 3D volumetric mask, and (c) render offset geometry. The GPU is used to compute the distance map within the 3D volumetric mask. The distance map and the 3D volumetric mask are accessible by a shader to provide a preview embossed mesh for graphical display. The system also includes a video display to graphically display the preview embossed mesh to the user.

18 Claims, 7 Drawing Sheets

(56) References Cited

U.S. PATENT DOCUMENTS

| | | |
|---|---|---|
| 2005/0195210 A1* | 9/2005 | Demers et al. ............... 345/584 |
| 2008/0158253 A1* | 7/2008 | Azar et al. .................... 345/626 |
| 2008/0246761 A1 | 10/2008 | Faken et al. |
| 2008/0261165 A1 | 10/2008 | Steingart et al. |
| 2009/0248184 A1 | 10/2009 | Steingart et al. |
| 2010/0291505 A1 | 11/2010 | Rawley et al. |

OTHER PUBLICATIONS

Chen, Real-Time Water Rendering based on the Graphics Hardware Acceleration, IEEEE, 2009, 6 pages.
Croix, et al., Introduction to GPU Programming for EDA, IEEE, 2009, 6 pages.
Frisken, et al., "Adaptively Sampled Distance Fields: A General Representation of Shape for Computer Graphics," Computer Graphics Proceedings, 2000, 6 pages.
International Search Report and Written Opinion for PCT/US2011/026282 mailed on May 26, 2011 (17 pages).
International Preliminary Report on Patentability, PCT/US2011/026282, Sep. 7, 2012, 12 pages.

* cited by examiner

SYSTEMS AND METHODS FOR CREATING NEAR REAL-TIME EMBOSSED MESHES

CROSS-REFERENCE TO RELATED APPLICATION

This application claims priority to and the benefit of, and incorporates herein by reference in its entirety, U.S. Provisional Patent Application No. 61/308,788, which was filed on Feb. 26, 2010.

FIELD OF THE INVENTION

The present invention relates generally to the field of computer graphics, and more particularly to the novel use of a graphics card to perform parallel processing of data to provide near real-time embossed meshes that are useful, for example, in dental laboratory software.

BACKGROUND OF THE INVENTION

In addition to the general purpose Central Processing Unit (CPU) found in all computers, many graphics oriented workstations are also equipped with special purpose display cards—i.e., expansion cards whose function is to generate and output images to a display—that are optimized for three-dimensional (3D) graphics or gaming. Example display cards include those manufactured by nVidia Corporation of Santa Clara, Calif., such as, but not limited to, the NVIDIA® GeForce® graphics processor and the NVIDIA® Quadro® systems. In certain display cards, the Graphics Processing Unit (GPU) is a multi-core programmable resource for both graphics and non-graphics processing.

While such graphics cards are useful in displaying data, no known prior art method has been developed to utilize these graphics cards to successfully perform parallel processing of data to provide near real-time embossed meshes for use, for example, in medical procedures such as, but not limited to, dental restoration procedures.

SUMMARY OF THE INVENTION

The present invention is directed towards the novel use of a GPU to perform parallel processing of data to provide embossed meshes of a graphical structure that are graphically displayed to a user in real time or near real-time while the user designs or edits the graphical structure. The systems and methods described herein are particularly useful, for example, in dental restoration software to design a portion of a partial framework where denture teeth are affixed. Unlike prior systems, which are hampered by large amounts of voxel data and/or algorithm complexity, the systems described herein allow a user to change design parameters and quickly view the results. For example, the user may change a UV mapping function or an embossing distance, and the results of those changes may be displayed in real-time. By allowing the user to quickly visualize changes to the graphical structure, the efficiency of the design process is improved.

In one aspect, the invention relates to a system for creating a preview embossed mesh for graphical display to a user. The system includes a graphical user interface device configured to receive input from a user and transmit the input to a computer, which includes a Graphics Processing Unit (GPU) and a Central Processing Unit (CPU). The system also includes a memory for use with the computer. The memory includes computer software configured to: (a) determine a 3D volumetric mask representing a region of a graphical object to be embossed, the region selected by the user according to the user input; (b) determine a distance map corresponding to the 3D volumetric mask; and (c) render offset geometry, trimmed to the 3D volumetric mask. The GPU is used to compute the distance map within the 3D volumetric mask. The distance map and the 3D volumetric mask are cached within the memory so that the distance map and the 3D volumetric mask are accessible by a shader to provide a preview embossed mesh for graphical display to the user. The system also includes a video display configured to graphically display the preview embossed mesh to the user.

In certain embodiments, the GPU is configured to perform parallel processing of voxel data to determine the 3D mask volume that includes the distance map. In another embodiment, the graphical user interface device is a joystick, a keyboard, a stylus, a roller ball, a touch screen, and/or a tablet. The distance map may include a Euclidean distance map. The computer software may be configured to compute vertex displacements for a 3D mesh and, optionally, to compute texture displacements. In one embodiment, the memory includes memory for a standard specification defining a cross-language, cross-platform API. Similarly, the shader may include a shader for a standard specification defining a cross-language, cross-platform API. The preview embossed mesh may be a real-time preview.

In another aspect, the invention relates to a method for creating a preview embossed mesh for graphical display to a user. The method includes: (i) determining a 3D volumetric mask representing a region of a graphical object to be embossed, the region selected by a user according to user input; (ii) determining a distance map corresponding to the 3D volumetric mask; (iii) rendering offset geometry, trimmed to the 3D volumetric mask, wherein a GPU is used to compute the distance map within the 3D volumetric mask, and wherein the distance map and the 3D volumetric mask are cached within a memory so that the distance map and the 3D volumetric mask are accessible by a shader to provide a preview embossed mesh for graphical display to the user; and (iv) graphically displaying the preview embossed mesh to the user. The description of elements of the embodiments above can be applied to this aspect of the invention as well.

In certain embodiments, the method includes the step of (v) parallel processing voxel data to determine the 3D mask volume that includes the distance map. In another embodiment, the method includes the step of (v) receiving user input from a graphical user interface device. The distance map may include a Euclidean distance map. The method may include the step of (v) computing vertex displacements for a 3D mesh and, optionally, the step of (vi) computing texture displacements. The memory may include memory for a standard specification defining a cross-language, cross-platform API. Similarly, the shader may include a shader for a standard specification defining a cross-language, cross-platform API. The graphically displaying step may be performed real-time.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

While the invention is particularly shown and described herein with reference to specific examples and specific embodiments, it should be understood by those skilled in the art that various changes in form and detail may be made therein without departing from the spirit and scope of the invention.

Figure 1:
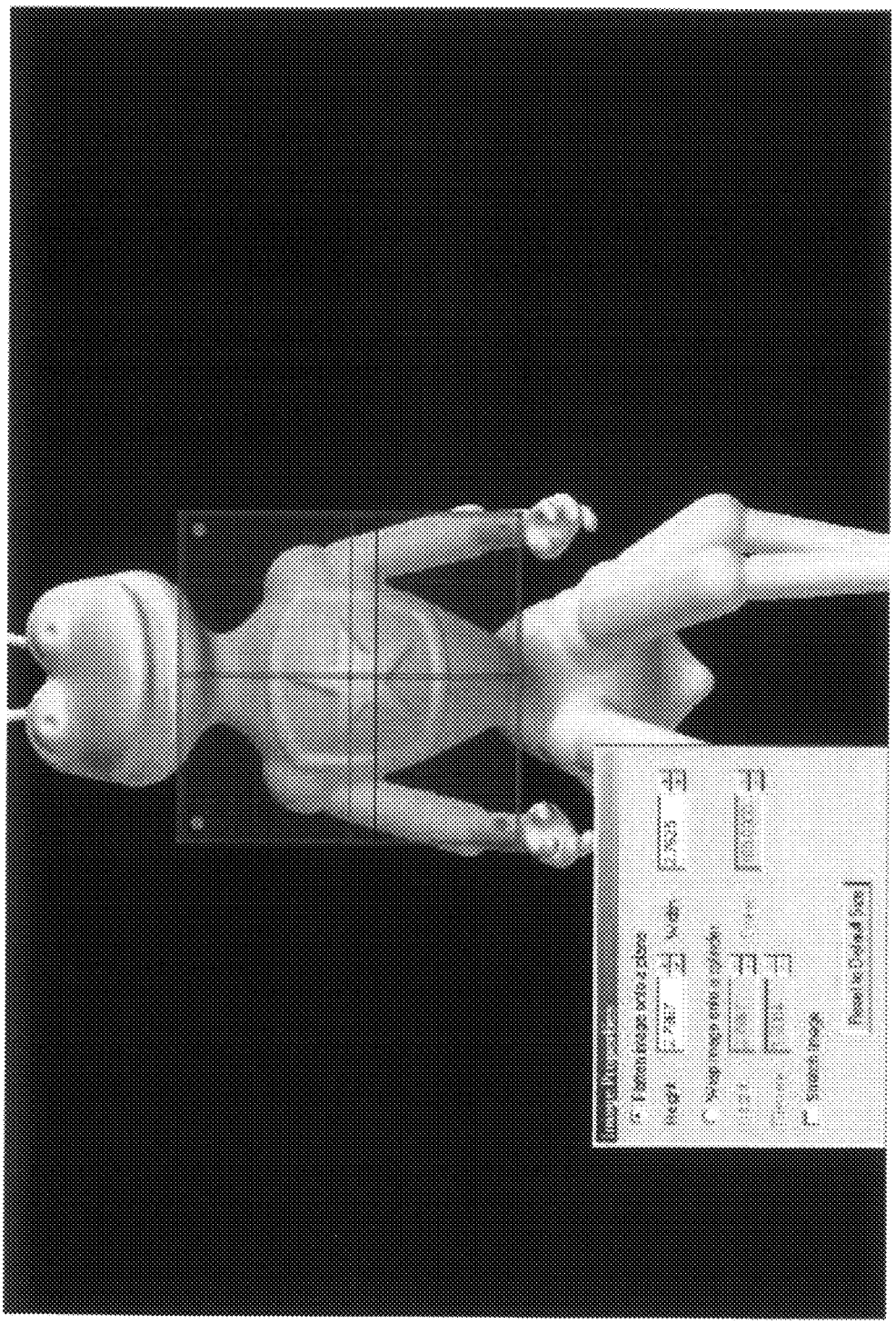
Figure 2:
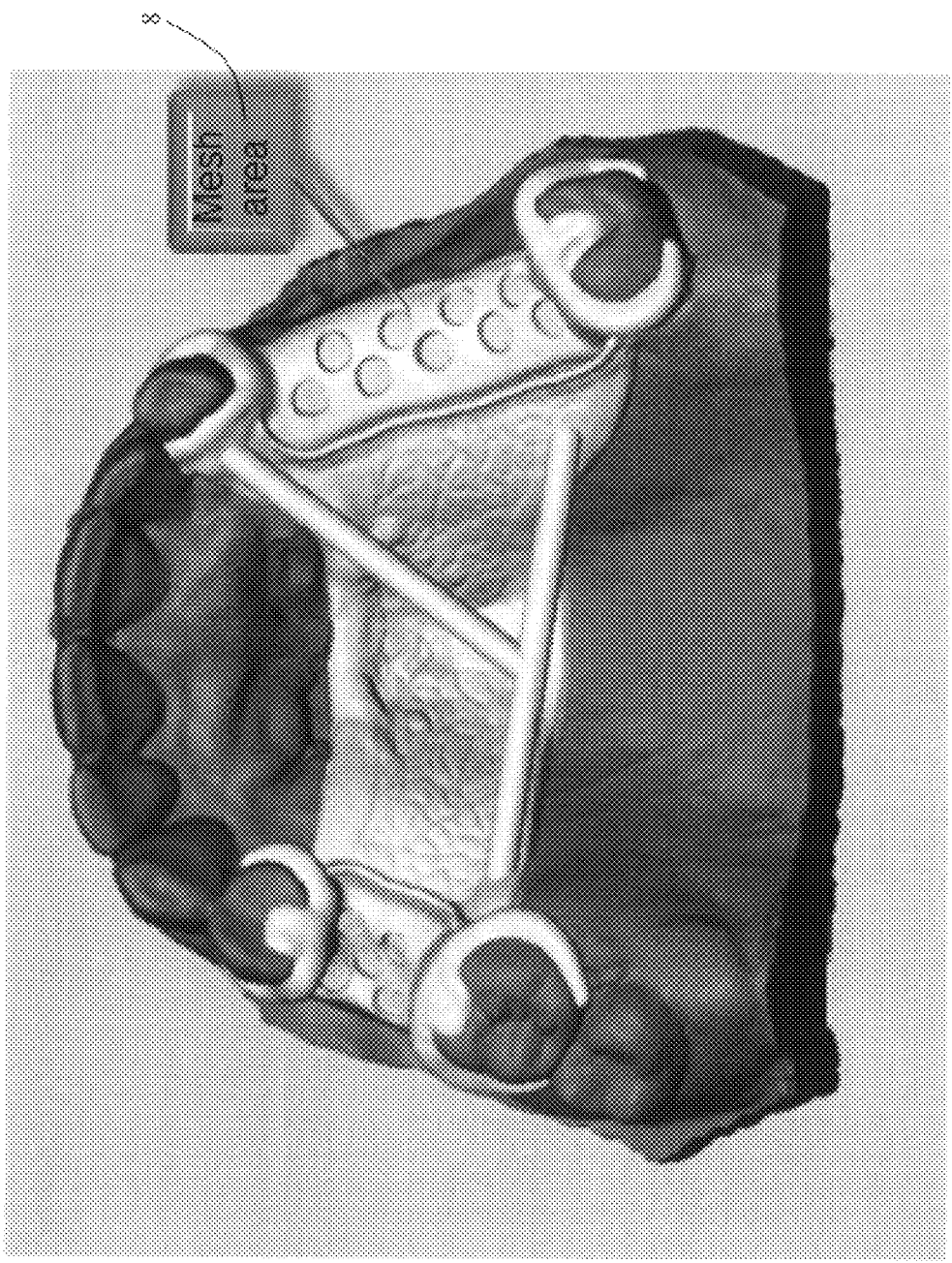
Figure 3:
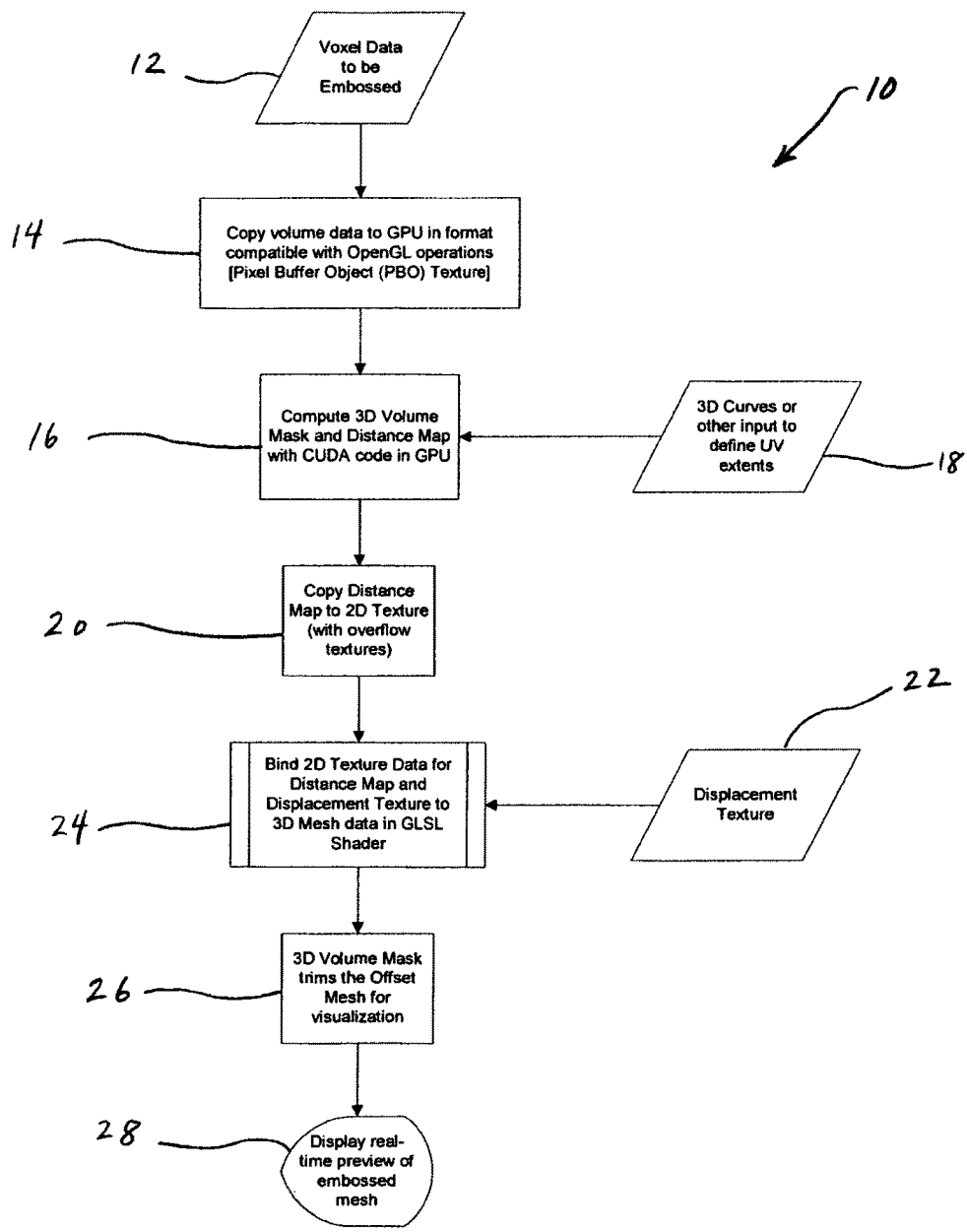
Figure 4:
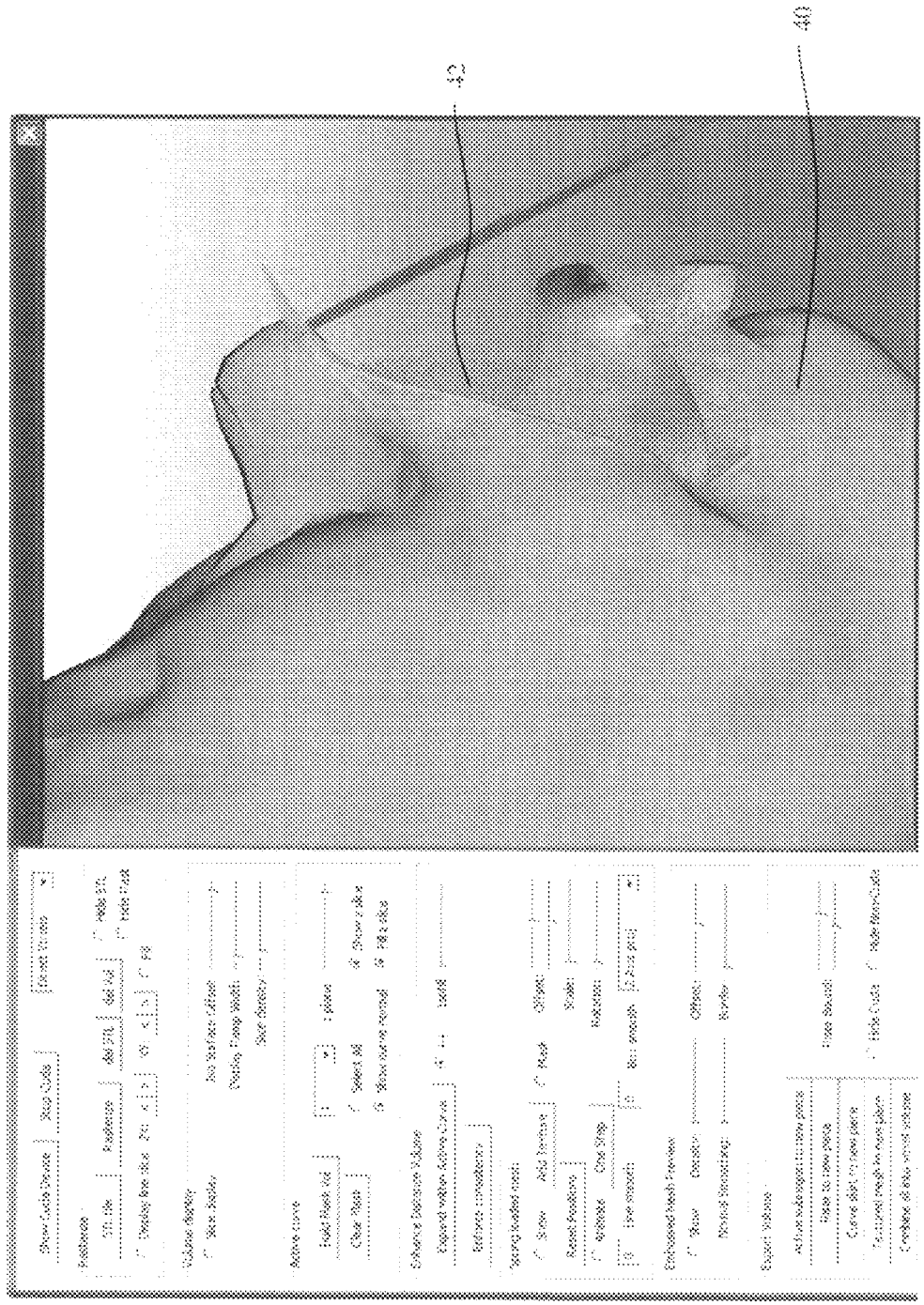
Figure 5:
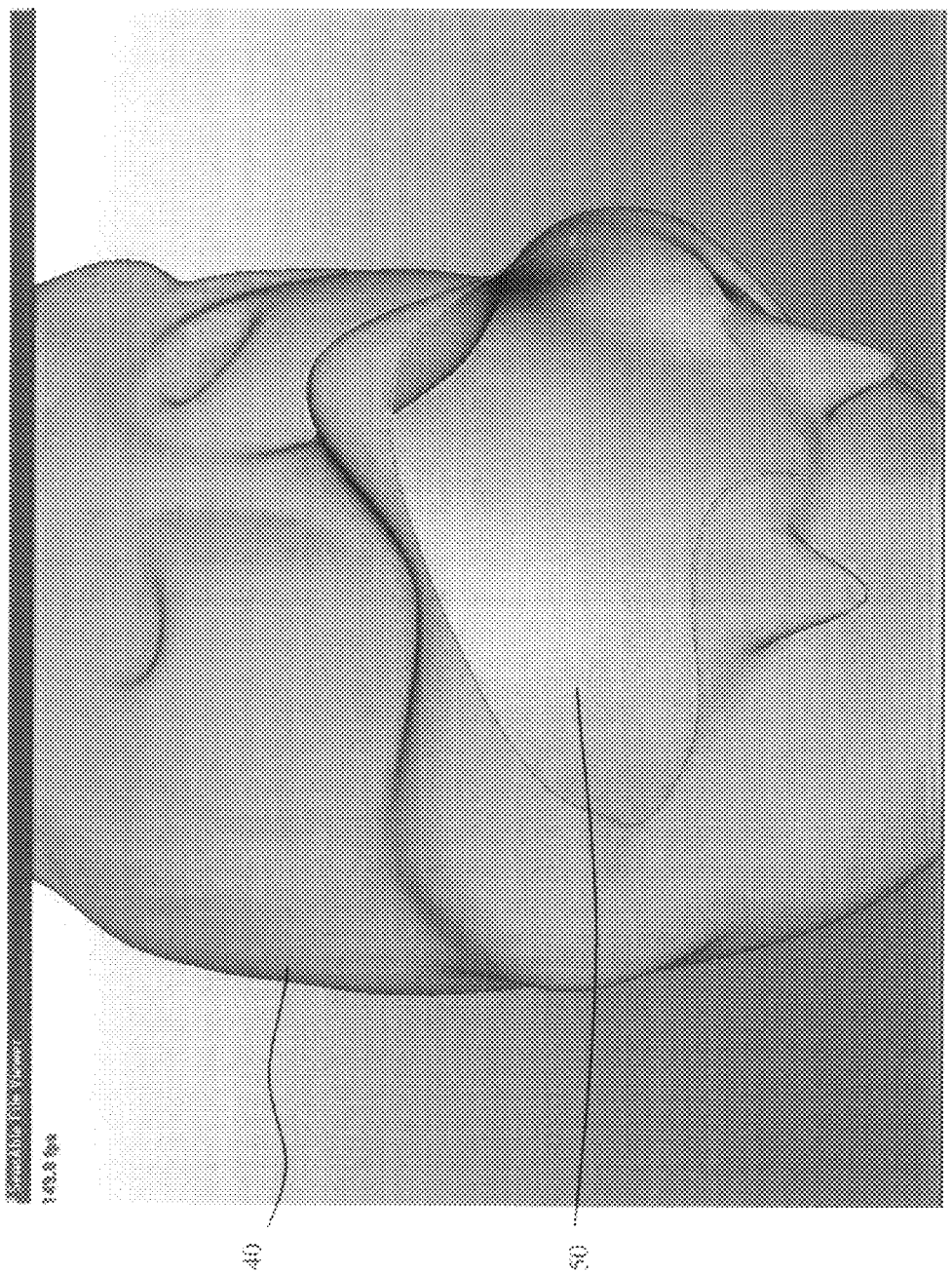
Figure 6:
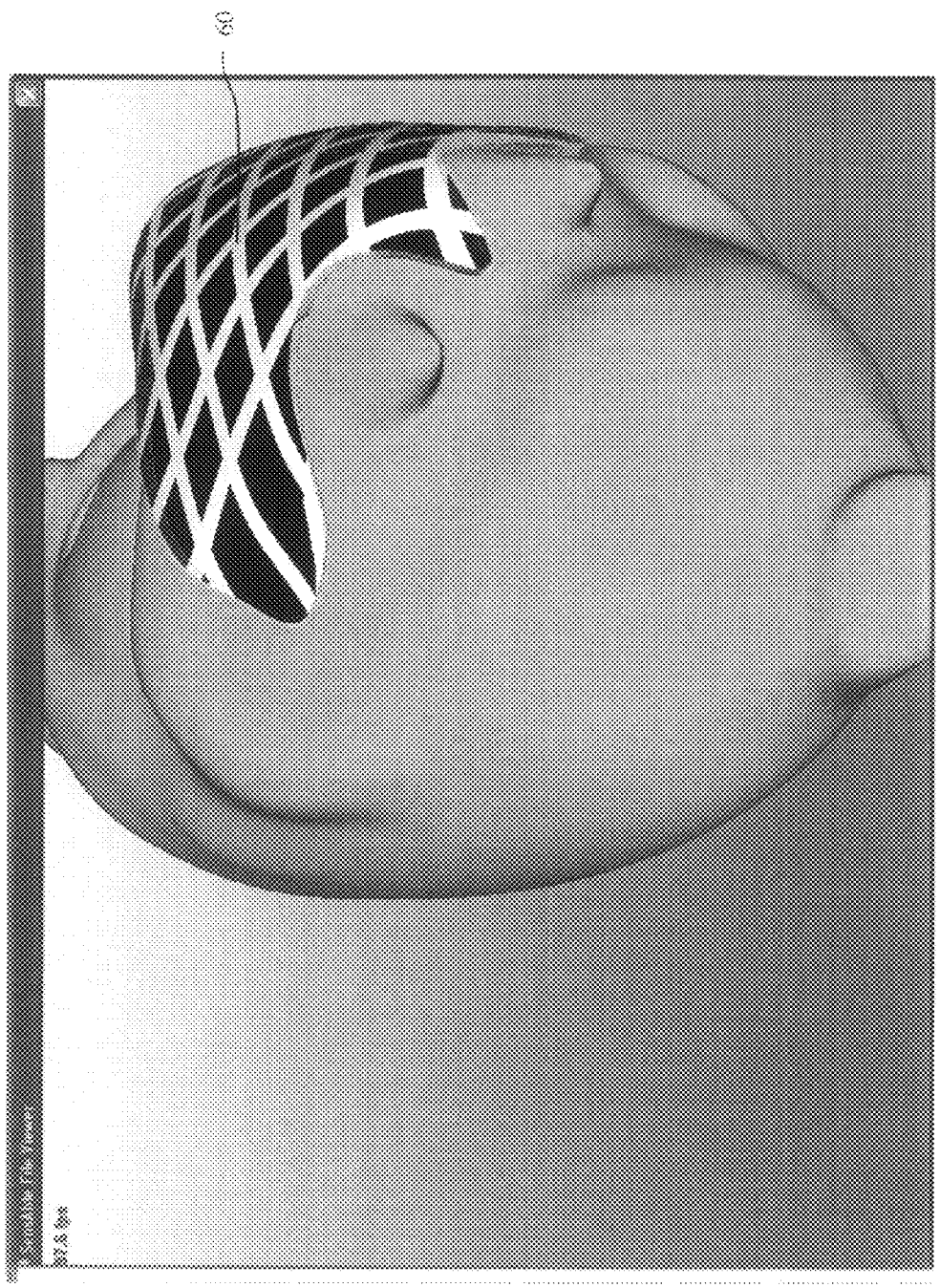
Figure 7:
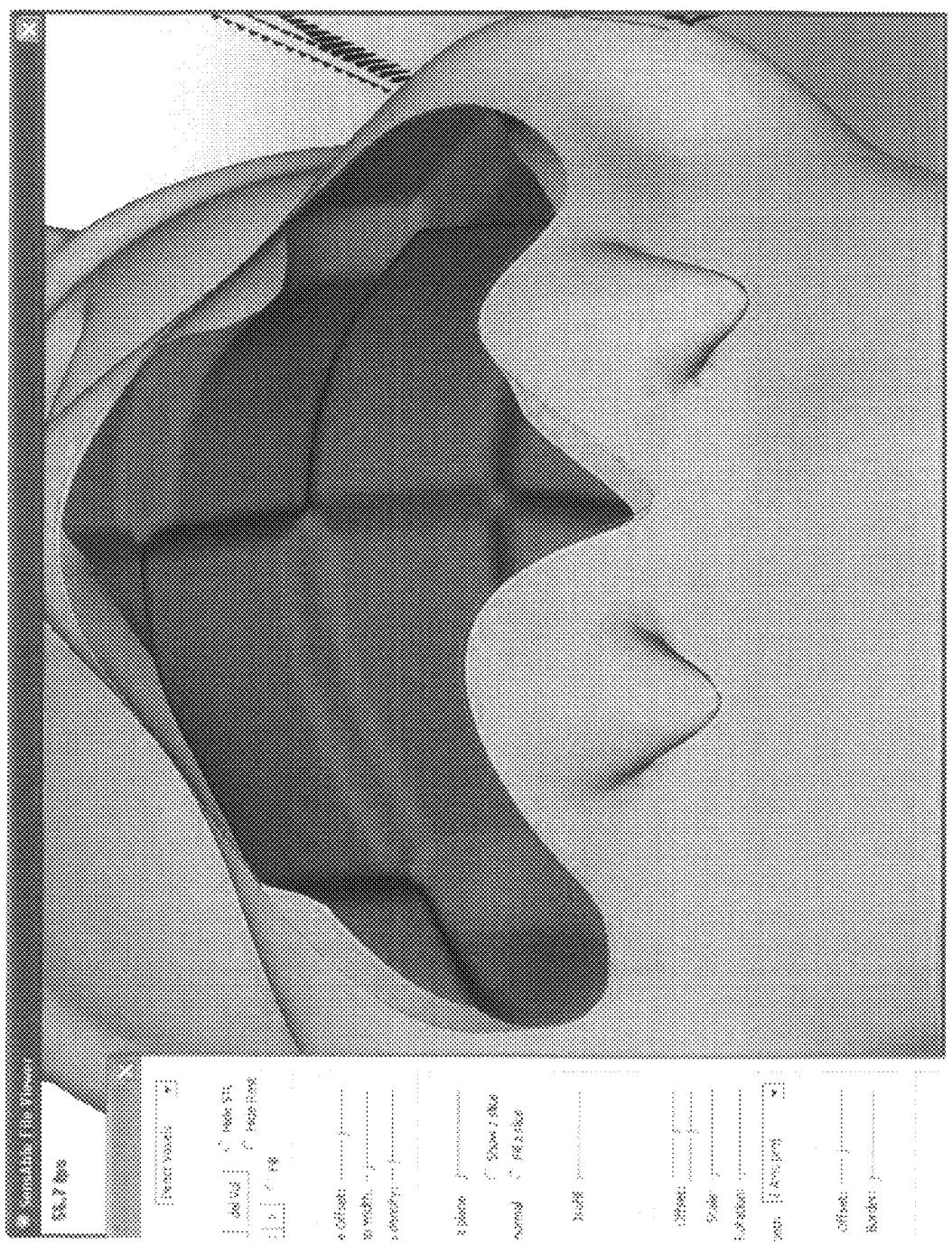

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIG. 1 is a screenshot from a graphics software application illustrating an embossed offset of a three-dimensional surface of a bug, in accordance with one embodiment of the invention;

FIG. 2 is a screenshot from dental laboratory software for design and/or modification of a partial framework for use in affixation of dental teeth, in accordance with one embodiment of the invention;

FIG. 3 is a flowchart of an illustrative method of creating a graphical preview of an embossed mesh, in accordance with one embodiment of the invention;

FIG. 4 is a screenshot from a graphics software application illustrating original volume data for an example graphical structure and a border for a desired emboss location on the example graphical structure, in accordance with one embodiment of the invention;

FIG. 5 is a screenshot of the graphical structure of FIG. 4 after clipping, in accordance with one embodiment of the invention;

FIG. 6 is a screenshot of the graphical structure of FIGS. 4 and 5 with a 3D mesh fitted within the mask volume, in accordance with one embodiment of the invention; and FIG. 7 is a screenshot of the near real-time emboss preview for the structure of FIGS. 4-6 after binding the 3D mesh and volumetric mask to a GLSL shader, in accordance with one embodiment of the invention.

DETAILED DESCRIPTION OF THE INVENTION

It is contemplated that devices, systems, methods, and processes of the claimed invention encompass variations and adaptations developed using information from the embodiments described herein. Adaptation and/or modification of the devices, systems, methods, and processes described herein may be performed by those of ordinary skill in the relevant art.

Throughout the description, where devices and systems are described as having, including, or comprising specific components, or where processes and methods are described as having, including, or comprising specific steps, it is contemplated that, additionally, there are devices and systems of the present invention that consist essentially of, or consist of, the recited components, and that there are processes and methods according to the present invention that consist essentially of, or consist of, the recited processing steps.

It should be understood that the order of steps or order of performing certain actions is immaterial so long as the invention remains operable. Moreover, two or more steps or actions may be conducted simultaneously.

The mention herein of any publication, for example, in the Background section, is not an admission that the publication serves as prior art with respect to any of the claims presented herein. The Background section is presented for purposes of clarity and is not meant as a description of prior art with respect to any claim.

GPU architecture is well suited to perform "data-parallel" computations in which the same machine instructions are executed on many data elements all at once. Parallel processing may remove the typical CPU requirements for sophisticated flow control. Applications that process large data sets such as arrays can benefit from a data-parallel programming model. 3D rendering algorithms that process large numbers of pixels and vertices may also be mapped to parallel threads. Similarly, image processing algorithms—such as algorithms for video post-processing, image scaling, or pattern recognition—may also be accelerated by data-parallel processing.

In certain embodiments, a 3D virtual object has a voxel-based representation. For example, each of a plurality of volumetric elements (voxels) is associated with a value according to its proximity to a surface of the virtual object in object space. Voxel-based representation is useful, for example, in haptically rendering a 3D virtual object.

Example 3D modeling systems for use with the systems and methods described herein include those manufactured by SensAble Technologies, Inc. of Woburn, Mass., such as, but not limited to, the FreeForm® systems (i.e., touch-enabled solutions for fast 3D modeling of complex, highly-detailed, organic shapes for manufacturing) and the SensAble Dental Lab System (i.e., an integrated digital solution to scan, design, and fabricate common dental restorations). FreeForm® systems and the SensAble Dental Lab systems (SDLS) both use a voxel representation to capture the volume and surface of 3D geometric shapes known as clay. One user function common to both FreeForm® and SDLS is to apply a texture to the voxel data to represent an embossed (or debossed) offset to the three-dimensional surface. In FreeForm®, this feature may be applied to add detail to clay models from images. For example, FIG. 1 shows the breastplate detail on a bug being embossed from an image of the breastplate.

Detail may be added to a clay model using texture mapping, which is a process by which points on the surface of a virtual object are related to points of a texture. For example, a point on the surface of a 3D virtual object can be mapped to a point on a two-dimensional (2D) surface; or, equivalently, a point on the 2D surface can be mapped to a point on the surface of the 3D virtual object. The 3D virtual object is generally represented in object space, for example, as a system of elements and/or points in a Cartesian (x, y, z) coordinate system.

The ability to apply textures, such as embossments, has applications in various medical, dental, and engineering fields. In dental restoration software (e.g., SDLS), for example, the ability to emboss information onto 3D models is advantageous for processes such as, but not limited to, designing the portion of a partial framework 8 where the denture teeth are affixed. An example partial framework for dental teeth is shown in FIG. 2.

Prior systems, however, have been unable to create interactive (e.g., graphically and/or haptically interactive), real-time previews of new embossed clay shapes. These systems have been hampered by, for example, the large amount of voxel data being changed, and the fundamental complexity of the emboss algorithm in calculating surface displacements based on the image data. In various embodiments, the systems and methods described herein provide a real-time preview of embossed or debossed clay shapes. The clay shapes may be defined through a voxel geometry (clay), a texture map (or image), a mapping function (or projection method) to define UV coordinates on the clay for the texture map, and a parameter such as the "embossing distance" (iso value). Creating the preview allows a user to interactively change the embossment parameters, such as the UV mapping function (e.g., making a two-dimensional image representing a 3D model) or the embossing distance, and see the results of those changes in real-time.

In certain embodiments, the present invention also allows the use of a GPU to improve the performance of slow operations, even if the end result is not real-time. Depending on the size of the volume data (e.g., the size of the clay shapes) or the size of the texture image, it may not be possible to achieve fully real time performance, even with the GPU. Even in these instances, however, the systems and methods described herein provide a substantial performance increase over previous systems and methods.

In one embodiment of the invention, a voxel emboss operation is broken into three distinct steps: (1) calculating a 3D Volumetric Mask representing the region in space that can be embossed; (2) calculating a Distance Map within the 3D Volumetric Mask; and (3) rendering the offset geometry, trimmed to the volumetric mask, as quickly as possible. To obtain the desired overall performance, it may be necessary to coordinate the output of Step (2) to allow Step (3) to proceed with a minimum of data casting or translation.

In certain embodiments, a standard specification, such as Open Graphics Library (OpenGL®), defines a cross-language, cross platform Application Programming Interface (API). The standard specification includes function calls that can be used to draw three-dimensional scenes from simple primitives. The standard specification may also include a shader and texture memory.

Embodiments of the present invention provide a general way to use a GPU to perform data-parallel processing of voxel data to create a 3D Mask Volume that includes a Distance Map. This data structure may then be used, for example, by a shader (e.g., an OpenGL® Shading Language "GLSL" shader) to calculate vertex displacements for a 3D mesh, in conjunction with optional texture displacements, trimmed to the 3D Mask Volume in real-time. In particular, a GPU may first be used to calculate a Euclidean Distance Map within a masked portion of the original volume data (clay). The Distance Map and Mask Volume data may then be cached in such a way within the OpenGL® texture memory so that a GLSL shader can access that data to provide a real-time preview for the final embossed clay.

A flowchart showing a method 10 for displaying a real-time preview of an embossed mesh, in accordance with one embodiment of the invention, is shown in FIG. 3. Voxel data for a 3D virtual object, such as a patient's mouth, teeth, or other body part, is provided at step 12. At step 14, the voxel data is copied to the GPU. The data may be in a format that is compatible with OpenGL operations, such as Pixel Buffer Object (PBO). A 3D volume mask and a distance map are computed at step 16 using, for example, a Compute Unified Device Architecture (CUDA) in the GPU. The UV extents are provided at step 18 using, for example, 3D curves or other geometric input. At step 20, the computed distance map is copied to 2D texture data, which may include overflow textures. 2D displacement texture is provided, at step 22, and is copied to the 2D texture data. The 2D texture data, including the distance map and displacement texture, is then attached, at step 24, to 3D mesh data to produce an offset or embossed mesh. The 2D texture data may be attached using, for example, a GLSL shader. For visualization purposes, at step 26, the embossed mesh is trimmed using the 3D volume mask. Finally, a real-time preview of the embossed mesh is displayed at step 28.

An example of the creation of a real-time preview of an embossed mesh is shown in FIGS. 4-7. FIG. 4 shows a screenshot of the inputs for an example 3D mask generation. Original volume data 40 is for an example structure referred to herein as "Vampire Boy." A ribbon 42 on the image shows a border for a curve that defines the extent for the desired embossment.

FIG. 5 shows a 3D Mask Volume 50 extending from inside the volume data 40. Here, the effect of clipping the Vampire Boy volume data 40 to the computed 3D Mask is shown. Because it is often an expensive operation, in certain embodiments, the Distance Map may be calculated only within the extent of the 3D Mask Volume 50.

FIG. 6 shows a 3D mesh being fit within the Mask Volume. For clarity, the optional texture displacement map 60 is shown here as a traditional 2D texture.

For the real-time preview, the 3D mesh and the volumetric Mask (represented as an array of 2D Textures) are bound to the GLSL shader and the mask trims the mesh in real-time, as shown in FIG. 7. The vertex displacements are calculated using the Distance Map data.

Finally, once a user is satisfied with the preview output, the displacement data may be composited into the CPU volume representation of the clay as the texture data is pulled out of the GPU.

A computer hardware apparatus may be used in carrying out any of the methods described herein. The apparatus may include, for example, a general purpose computer, an embedded computer, a laptop or desktop computer, or any other type of computer that is capable of running software, issuing suitable control commands, receiving graphical user input, and recording information. The computer typically includes one or more central processing units for executing the instructions contained in software code that embraces one or more of the methods described herein. The software may include one or more modules recorded on machine-readable media, where the term machine-readable media encompasses software, hardwired logic, firmware, object code, and the like. Additionally, communication buses and I/O ports may be provided to link any or all of the hardware components together and permit communication with other computers and computer networks, including the internet, as desired.

Embodiments of the invention may be used with methods and systems described in the following patents and/or applications, the texts of which are hereby incorporated by reference in their entirety: pending U.S. patent application Ser. No. 12/692,459, titled, "Haptically Enabled Coterminous Production of Prosthetics and Patient Preparations in Medical and Dental Applications," by Rawley et al.; pending U.S. patent application Ser. No. 12/321,766, titled, "Haptically Enabled Dental Modeling System," by Steingart et al., published as U.S. Patent Application Publication No. 2009/0248184; pending U.S. patent application Ser. No. 11/998,457, titled, "Systems for Haptic Design of Dental Restorations," by Steingart et al., published as U.S. Patent Application Publication No. 2008/0261165; pending U.S. patent application Ser. No. 11/998,877, titled, "Systems for Hybrid Geometric/Volumetric Representation of 3D Objects," by Faken et al., published as U.S. Patent Application Publication No. 2008/0246761; pending U.S. patent application Ser. No. 10/733,862, titled, "Apparatus and Methods for Wrapping Texture onto the surface of a Virtual Object," by Berger et al., published as U.S. Patent Application Publication No. 2005/0128211; U.S. Pat. No. 7,626,589, titled, "A Haptic Graphical User Interface for Adjusting Mapped Texture," by Berger; U.S. Pat. No. 7,149,596, titled, "Apparatus and Methods for Modifying a Model of an Object to Enforce Compliance with a Manufacturing Constraint," by Berger et al.; U.S. Pat. No. 6,958,752, titled, "Systems and Methods for Three-Dimensional Modeling," by Jennings, Jr. et al.; U.S. Pat. No. 6,867,770, titled, "Systems and Methods for Voxel Warping," by Payne; U.S. Pat. No. 6,421,048, titled, "Systems and Methods for Interacting With Virtual Objects in A Haptic Virtual Reality Environment," by Shih et al.; and U.S. Pat. No. 6,111,577, titled, "Method and Apparatus for Determining Forces to be Applied to a User Through a Haptic Interface," by Zilles et al.

EQUIVALENTS

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A system for creating a preview embossed mesh for graphical display to a user, the system comprising:
   a graphical user interface device configured to receive input from a user and transmit said input to a computer, said computer comprising a Graphics Processing Unit (GPU) and a Central Processing Unit (CPU);
   a memory for use with said computer, the memory comprising computer software configured to:
   (a) determine a 3D volumetric mask representing a region of a graphical object to be embossed, said region selected by said user according to said user input;
   (b) determine a distance map corresponding to said 3D volumetric mask; and
   (c) render offset geometry, trimmed to said 3D volumetric mask, wherein said GPU is used to compute said distance map within said 3D volumetric mask, and wherein said distance map and said 3D volumetric mask are cached within said memory so that said distance map and said 3D volumetric mask are accessible by a shader to render the offset geometry and thereby provide a preview embossed mesh for graphical display to said user; and
   a video display configured to graphically display said preview embossed mesh to said user.

2. The system of claim 1, wherein said GPU is configured to perform parallel processing of voxel data to determine said 3D volumetric mask that includes said distance map.

3. The system of claim 1, wherein the graphical user interface device is at least one member selected from the group consisting of a joystick, a keyboard, a stylus, a roller ball, a touch screen, and a tablet.

4. The system of claim 1, wherein the distance map comprises a Euclidean distance map.

5. The system of claim 1, wherein the computer software being configured to render offset geometry includes being configured to compute vertex displacements for a 3D mesh.

6. The system of claim 5, wherein the computer software is configured to compute texture displacements, which are further accessible by the shader to render the offset geometry.

7. The system of claim 1, wherein the memory comprises memory for a standard specification defining a cross-language, cross-platform API.

8. The system of claim 1, wherein the shader comprises a shader for a standard specification defining a cross-language, cross-platform API.

9. The system of claim 1, wherein the preview embossed mesh is a real-time preview.

10. A method for creating a preview embossed mesh for graphical display to a user, the method comprising:
    (i) determining a 3D volumetric mask representing a region of a graphical object to be embossed, said region selected by a user according to user input;
    (ii) determining a distance map corresponding to said 3D volumetric mask;
    (iii) rendering offset geometry, trimmed to said 3D volumetric mask, wherein a GPU is used to compute said distance map within said 3D volumetric mask, and wherein said distance map and said 3D volumetric mask are cached within a memory so that said distance map and said 3D volumetric mask are accessible by a shader to render the offset geometry and thereby to provide a preview embossed mesh for graphical display to said user; and
    (iv) graphically displaying said preview embossed mesh to said user.

11. The method of claim 10, comprising the step of (v) parallel processing voxel data to determine said 3D volumetric mask that includes said distance map.

12. The method of claim 10, comprising the step of (v) receiving user input from a graphical user interface device.

13. The method of claim 10, wherein the distance map comprises a Euclidean distance map.

14. The method of claim 10, wherein rendering offset geometry includes computing vertex displacements for a 3D mesh.

15. The method of claim 14, wherein rendering offset geometry further includes computing texture displacements, which are further accessible by the shader to render the offset geometry.

16. The method of claim 10, wherein the memory comprises memory for a standard specification defining a cross-language, cross-platform API.

17. The method of claim 10, wherein the shader comprises a shader for a standard specification defining a cross-language, cross-platform API.

18. The method of claim 10, wherein the graphically displaying step is performed real-time.

* * * * *